United States Patent Office

2,775,619
Patented Dec. 25, 1956

2,775,619

PREPARATION OF PARAFORMALDEHYDE

Alexander Galat, Yonkers, N. Y.

No Drawing. Application September 25, 1953,
Serial No. 382,450

9 Claims. (Cl. 260—615)

This invention relates principally to a new and novel process for the production of paraformaldehyde. More particularly, this invention relates to a new and novel process for the production of paraformaldehyde in a form exhibiting a greater reactivity and a greater solubility than paraformaldehyde prepared by presently known commercial procedures.

As is well known, formaldehyde is an extremely important chemical raw material. This aldehyde is produced in enormous quantities, either by the partial oxidation of natural gas or by the partial oxidation of methanol. Formaldehyde is a gas (B. P. —21° C.) which even at the boiling point slowly changes to the cyclic trimer, trioxymethylene, the rate of this polymerization reaction increasing rapidly with increasing temperature. Accordingly, the large scale preparation, transportation and storage of formaldehyde for subsequent use in chemical syntheses is not practical.

Fortunately, formaldehyde is very soluble in water and an aqueous solution containing 37% formaldehyde by weight (formalin) is the form in which this aldehyde most frequently appears in commerce. However, formalin leaves much to be desired as a chemical raw material. The solution is corrosive and is not too stable in storage, especially at temperatures above and below ordinary room temperatures. In addition, due to the low concentration of formaldehyde in formalin the rates of reaction in syntheses employing formalin are frequently quite low and the size of a batch that can be processed in a given piece of equipment is small. Since formalin contains over 60% by weight of water it is necessary to transport, handle and store this large amount of solvent.

To offset the corrosive nature of formalin, this material is usually shipped in insulated resin lined tank cars or in resin lined drums. At the point of consumption, handling of the solution should be through chemical rubber hose or corrosion resistant pipe to storage facilities constructed of stainless steel (type 304 or, preferably, types 316 or 317), aluminum (types 2S, 3S, 52S or 61S-T) or mild steel coated with a suitable resin. Obviously, these requirements add greatly to the cost of transporting, handling and storing formalin. It should be noted that these requirements with respect to materials of construction are necessary not only to prevent corrosion of equipment but also to avoid contamination of the formalin with the products of corrosion. Traces of many metal salts, for example, iron salts, greatly reduce the stability of formalin.

Formalin is quite unstable. To enhance the stability of the solution it is common practice to incorporate methanol therein as an inhibitor. For tank car shipments about 7% methanol is commonly employed while drum shipments commonly contain 12–14% methanol. Methanol is a valuable chemical and chemical raw material and is, in fact, one of the major raw materials for the production of formaldehyde. The use of such large amounts of methanol as an inhibitor is a distinct economic waste and represents an appreciable item in the cost of the so inhibited formalin. The stability of inhibited formalin still leaves much to be desired. When exposed to cold weather paraformaldehyde separates from the solution. After relatively short exposure to but moderately low temperatures the separated paraformaldehyde may be dissolved by heating the solution but if the formalin is in resin lined containers care must be taken not to heat the solution above 60° C. lest the resin lining be injured. Prolonged exposure to very low temperatures results in the separation of large quantities of paraformaldehyde in a form that is impossible to dissolve. High temperature storage is equally undesirable. At high temperatures the acidity of the solution increases, due probably to the enhanced rate of oxidation of formaldehyde to formic acid. The increased acidity accelerates many decomposition reactions of formaldehyde. For example, the union of formaldehyde with methanol to form methylal is accelerated by acids, especially in the presence of traces of metal salts. Also, under acidic conditions and at elevated temperatures the Cannizzaro reaction may occur resulting in the formation of formic acid (which still further increases acidity) and methanol (which may react to form additional methylal). For all these reasons it is generally recommended that even inhibited formalin be stored for as short a period as possible at a temperature above 15° C. and below 40° C. This generally requires that storage containers be provided with heating coils and some means for cooling.

The high water content (63% by weight) of formalin is obviously highly disadvantageous. Most natural gas fields are located at great distances from major formaldehyde consuming centers and if formalin is prepared at or near these fields it is necessary to ship almost two pounds of water to the distant major consuming centers in order to deliver one pound of formaldehyde thereto. The transportation cost of this large quantity of water accounts for a very appreciable part of the delivered cost of the formalin. For this reason, in some instances natural gas is employed to produce methanol at or near the gas field and this methanol is shipped to formaldehyde consuming centers where it is converted into formalin for use in the immediate vicinity. The consumer of formalin must not only pay the transportation cost of the large quantity of water contained therein but also, in most instances, must go to the trouble and expense of removing this water at some stage of the process in which formalin is employed as a reactant since most chemical products synthesized by use of formalin are marketed in water free form.

Also, because of the low concentration of formaldehyde in formalin, the volumetric yield from a reaction vessel in which formalin is one of the reactants is low. In addition, the low concentration of formaldehyde in formalin frequently results in a low reaction rate in synthetic processes employing this material as a reactant. Finally, most formaldehyde reactions of commercial importance are condensations involving the elimination of water. Obviously, the addition of large quantities of water to reactions of this type is contrary to the teachings of chemical kinetics and, in fact, many condensations that can be achieved when formaldehyde is employed do not occur when formalin is used as the source of formaldehyde.

Because of the above mentioned and many other disadvantages of formalin, many attempts have been made to produce formaldehyde in a form more amenable to transportation, handling, storage and use. Formaldehyde exists in two polymeric modifications, the cyclic trimer, trioxymethylene, and the linear polymer, paraformaldehyde. While trioxymethylene is a definite chemical compound, the term paraformaldehyde embraces a whole series of linear formaldehyde polymers which may contain from two to a large number of oxymethylene units.

While gaseous formaldehyde is an extxremely reactive aldehyde, formalin does not show this high degree of reactivity. Many theories have been put forward to explain the relative non-reactivity of formalin. According to one such theory, a molecule of formaldehyde immediately unites with a molecule of water to form the hypothetical formaldehyde hydrate or the hypothetical methylene diol, either of which would be expected to be less reactive than formaldehyde itself. Although the gem-diol configuration is very rare in organic chemistry, the additive power of the carbonyl group of formaldehyde is so great that the formation of a formaldehyde hydrate or even a methylene diol would not be too surprising. As such a formalin solution ages, hydrated formaldehyde polymers of low molecular weight form very rapidly. These may be either hydrates of low molecular weight true polymers or a polyoxymethylene alpha omega diol of low molecular weight. These compounds, regardless of their true structure, would be expected to be considerably less reactive than formaldehyde itself. It is to be noted that, on the basis of this theory, paraformaldehyde is not a true polymer but rather a compound that may be represented by the empirical formula $(CH_2O)_x \cdot H_2O$. In accordance with the long established practice of the art, in this specification and in the appended claims, paraformaldehyde will be referred to as a "polymer."

Commercial forms of paraformaldehyde are produced by evaporation of an aqueous solution of formaldehyde. This evaporation is carried out under reduced pressure in order to avoid excessive loss of formaldehyde in the evolved vapors. When an aqueous solution of formaldehyde is heated to its boiling point under atmospheric pressure a large portion of the formaldehyde is lost with the vapors and comparatively little paraformaldehyde is obtained from the still bottoms. As explained previously, an aqueous formaldehyde solution probably consists of an aqueous solution of low molecular weight polymers (trimers, tetramers, pentamers, et cetera) which exist in complicated equilibrium with each other and the water present. This equilibrium may be indicated as follows on the basis of the hydrated polymer structure:

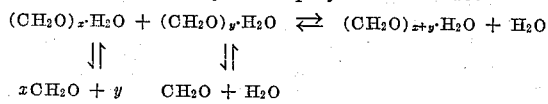

where $x$ is a small whole number and $y$ is a small whole number the same as or different than $x$.

Or, on the basis of the alpha omega diol configuration:

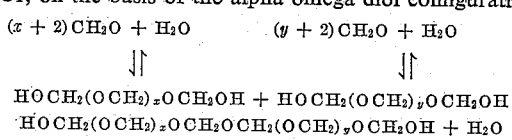

where $x$ is zero or a small whole number and $y$ is zero or a small whole number which number may be the same as or different than $x$.

At elevated temperatures, for example, the temperature at which an aqueous solution of formaldehyde boils at atmospheric pressure, the polymers tend to depolymerize, forming monomeric formaldehyde and water. This accounts for the large loss of formaldehyde when an aqueous solution of formaldehyde is boiled at atmospheric pressure and also for the greater chemical instability of formalin at elevated storage temperatures (e. g. greater tendency to oxidize to formic acid, greater tendency to undergo the Cannizzaro reaction under acidic conditions, et cetera).

Also, as the above equations show, the low molecular weight polymers can condense with each other to form polymers of higher molecular weight with elimination of water. This reaction is favored by low temperatures and accounts for the separation of paraformaldehyde from formalin solutions when stored at low temperatures for extended periods.

In the commercial preparation of paraformaldehyde by evaporation of aqueous formaldehyde solutions at reduced pressures the evaporation temperature is low. Because of the low temperatures employed, depolymerization of the low molecular weight polymers present to monomeric formaldehyde and loss of the monomer in the vapors is very considerably reduced (in comparison with evaporation at atmospheric pressure) and the conditions necessary for the production of polymers of higher molecular weight obtain.

It might be thought that the production of paraformaldehyde by the evaporation of aqueous formaldehyde solutions at reduced pressures represents a simple solution of all the difficulties entailed in the transportation, handling, storage and use of formalin. That this is not true is shown by the fact that practically all formaldehyde is produced, sold and used in the form of formalin. The production of paraformaldehyde involves so many difficulties that the price of flake paraformaldehyde delivered to major consuming centers is somewhat greater than that of formalin on the basis of equal weights of formaldehyde. Also, commercially available flake paraformaldehyde leaves much to be desired with respect to solubility and reactivity. These last named disadvantages are only very partially overcome by use of powdered paraformaldehyde but this product commands a premium of some 3.5 cents per pound over the flake material.

During the concentration of an aqueous solution of formaldehyde at reduced pressures a point is reached, usually at a formaldehyde content of 50-60%, at which separation of insoluble polymers causes the solution to gel. As additional water is removed, the still contents become a tough, viscous, plastic mass which finally solidifies. On the commercial scale, after the reaction mass has reached the gel stage, it is impossible to achieve a high rate of heat input throughout the still contents in the absence of stirring and since the mass soon becomes tough and plastic and then gradually solidifies an extremely powerful stirrer is required. Commercially it is usual practice to conduct the evaporation in a specially designed kneader which is expensive to construct and operate and has a low capacity. The final product from such a processing procedure is an insoluble and relatively unreactive paraformaldehyde far different in physical and chemical properties from the soluble and relatively reactive polymers contained in formalin solutions.

I have discovered a new and novel process for the preparation of paraformaldehyde which can be conducted in standard equipment and gives rise to a soluble and reactive paraformaldehyde in high yields.

One object of my invention is to provide a new and novel process for the production of paraformaldehyde.

Another object of my invention is to provide a new and novel process for the production of paraformaldehyde which can be conducted in standard equipment through standard procedures.

A further object of my invention is to provide a new and novel process for the production of a paraformaldehyde that is more readily soluble than varieties of paraformaldehyde hitherto available.

An additional object of my invention is to provide a new and novel process for the production of paraformaldehyde exhibiting a higher degree of chemical reactivity than hitherto available varieties of paraformaldehyde.

Other objects of my invention will become apparent as the description thereof proceeds.

Broadly and briefly, in my improved process for the production of paraformaldehyde, an aqueous solution of formaldehyde is heated at a temperature just below the boiling point thereof for a time sufficient to achieve essentially complete depolymerization of the low molecular weight polymers contained therein following which water is evaporated from the depolymerized solution at reduced pressure. Removal of uncombined water by evaporation of the depolymerized aqueous solution of formaldehyde at reduced pressure produces a liquid still bottoms which is clear or only very slightly turbid and is readily discharged from the still to suitable containers in which the bottoms rapidly solidify to form readily soluble and highly reactive paraformaldehyde.

It is evident that my new and novel process for the production of paraformaldehyde differs materially in methods and means employed and in results obtained from the prior art process. In the prior art process, an aqueous solution of formaldehyde, in which the greater part of the formaldehyde is present as low molecular weight polymers, is evaporated at reduced pressure. The polymers immediately begin to react with each other to form polymers of higher molecular weight and when only a comparatively small proportion of the uncombined water has been removed this reaction has proceeded to such an extent that the concentration of relatively insoluble, high molecular weight polymers is sufficient to gel the mixture and make it unmanageable unless highly specialized and expensive equipment is used. Continuation of water removal in such specialized squipment results in further increase in the molecular weight and decrease in the reactivity and solubility of the polymer. When all uncombined water has been removed, an insoluble and relatively unreactive paraformaldehyde is obtained.

In contrast, in my new and novel process, the first step involves depolymerization of the polymers present in the aqueous formaldehyde solution. Then the uncombined water is evaporated under reduced pressure from a solution which initially consists of monomeric formaldehyde which, as previously explained, is probably present largely in the form of formaldehyde hydrate or methylene diol. All free water may be removed before polymerization of the monomeric formaldehyde has proceeded to such an extent as to form insoluble polymers. Accordingly, after uncombined water has been removed, the still contents are in the form of a clear or, at worst, slightly turbid liquid consisting of moderately low molecular weight formaldehyde polymers. These still bottoms are discharged to a convenient container, for example a pan, wherein cooling and some additional polymerization soon results in solidification of the mass. The resulting solid, which is free from paraformaldehyde molecules of extremely high molecular weight, is readily soluble and highly reactive.

For the better understanding of my invention the following illustrative but non-limiting example thereof is given.

Example

Four hundred parts by weight of a 37% (by weight) aqueous solution of formaldehyde uninhibited with methanol was maintained at a temperature just below the boiling point (90–95° C.) for a period of one hour. After this depolymerizing step, vacuum was gradually applied to the solution, the pressure finally being reduced to 20 mm. of mercury. Uncombined water was removed from the solution at this reduced pressure, the evaporation being continued until the temperature of the liquid in the still reached 75–85° C. Vacuum was then released and the clear to very slightly turbid still contents were discharged to a shallow pan and were allowed to solidify.

Yield: 148 parts by weight; formaldehyde assay, 91%. Recovery of formaldehyde as solid polymer, 91%.

The polymer product was readily soluble in warm water, phenol and butanol, giving clear solutions within fifteen minutes or less. A commercial sample of paraformaldehyde could not be dissolved in any of these solvents over a period of more than two hours.

The time required for the depolymerization step depends upon the age of the formaldehyde solution being processed. In actual practice, my new and novel process would usually be employed in connection with aqueous solutions of formaldehyde soon after they have been produced. Such fresh solutions may be depolymerized by holding at 90–100° C. for a half hour to an hour.

Depolymerization time also depends upon the temperature employed in the depolymerization step. A temperature of 90–95° C. is preferably used for at this temperature loss of formaldehyde from the solution is not appreciable while the depolymerization reaction proceeds rapidly. If desired, the rate of depolymerization may be somewhat accelerated by boiling the solution under reflux. In such an operation it is preferable to pass evolved vapors through a packed column and thence to a total condenser. Liquid from the total condenser discharges into the upper part of the packed column and on passing downward therethrough serves to scrub formaldehyde from the ascending vapors and return it to the depolymerizer. Also, if desired, the depolymerization may be accomplished with extreme rapidity by heating aqueous formaldehyde solutions under pressure to a temperature above the atmospheric pressure boiling point of the solutions. Depolymerization also occurs at temperatures below 90° C. but, as would be expected, the time required for depolymerization increases as the depolymerization temperature is decreased.

The adequacy of a given depolymerization treatment may be readily determined by taking an aliquot of the so treated liquid, for example, about one pint, and subjecting it to distillation at a pressure of say 20 mm. of mercury, the rate of heat input to the still being so regulated that at least two hours are required for the temperature of the still contents to reach 75–85° C. If at or prior to this point the still contents contain appreciable solid material the depolymerization treatment was inadequate. If, on the other hand, on reaching a temperature of 75–85° C. the still contents are clear or, at worst, slightly turbid, they are poured onto a glass tray and allowed to cool and solidify. One part by weight of the resulting solid is added to two parts by weight water at 80–100° C. If complete solubility is attained within fifteen minutes the depolymerization conditions were adequate. If desired, phenol or butanol may be substituted for water in this test.

The pressure at which the free water is evaporated from the depolymerized solution is not too critical but is subject to certain limitations. If the pressure is too high this will result in a high evaporation temperature which reduces the rate of polymer formation and results in considerable loss of formaldehyde in the vapors. I have found that pressures below about 0.1 atmosphere are suitable for removal of free water from depolymerized formaldehyde solutions. The evaporation temperature corresponding to this pressure is sufficient to permit rapid polymerization of formaldehyde. Preferably, I employ a pressure in the approximate range 10 to 30 mm. of mercury as such a pressure is eminently suited for the purposes of the present invention and is readily attained by any one of a number of simple devices such as a steam jet ejector.

Paraformaldehyde prepared in accordance with my invention can be shipped and stored in standard multi-wall paper bags or fiber drums. It can be stored at ordinary temperatures for any desired period in such packages without adversely affecting solubility or reactivity.

Paraformaldehyde prepared in accordance with my invention may be employed in all applications where formalin is customarily employed. If an aqueous solution of formaldehyde is necessary (for example, in the preparation of pentaerythritol) such a solution is readily and quickly prepared from the paraformaldehyde of my invention. Such aqueous solutions may be employed, if desired, in the preparation of phenolic resins (for example) by standard procedures or, due to the ready solubility of the paraformaldehyde of my invention in phenols, these resins may be prepared in the essential absence of water thereby achieving a higher productive capacity from a given resin producing installation.

Formalin is not suitable for use in certain formaldehyde condensation reactions, for example, the formolit reaction involving the condensation of formaldehyde and aromatic hydrocarbons. Paraformaldehyde prepared in accordance with my invention is an eminently suitable source of formaldehyde for use in condensations of this type.

Be it remembered, that while this invention has been described in connection with specific details and a specific example thereof, these are illustrative only and are not to be considered limitations on the spirit or scope of said invention except in so far as these may be incorporated in the appended claims.

I claim:

1. The process of producing paraformaldehyde comprising heating to a temperature within the approximate range 90–100° C. an aqueous solution containing hydrated formaldehyde and formaldehyde polymers, maintaining said solution at said temperature for a period of about one half to one hour, removing water from the resulting depolymerized solution by evaporation at reduced pressure at such a rate that the still bottoms reach a temperature in the range 75–85° C. before the still bottoms exhibit more than a slight turbidity and cooling the still bottoms to produce solid paraformaldehyde.

2. The process of producing paraformaldehyde comprising heating to the atmospheric pressure boiling point thereof an aqueous solution containing hydrated formaldehyde and formaldehyde polymers, maintaining said solution at its atmospheric pressure boiling point for a period of about one half to one hour, removing water from the resulting depolymerized solution by evaporation at reduced pressure at such a rate that the still bottoms reach a temperature in the range 75–85° C. before the still bottoms exhibit more than a slight turbidity and cooling the still bottoms to produce solid paraformaldehyde.

3. The process of producing paraformaldehyde comprising heating to a temperature within the approximate range 90–95° C. an aqueous solution containing hydrated formaldehyde and formaldehyde polymers, maintaining said solution at said temperature for a period of about one half to one hour, removing water from the resulting depolymerized solution by evaporation at reduced pressure at such a rate that the still bottoms reach a temperature in the range 75–85° C. before the still bottoms exhibit more than a slight turbidity and cooling the still bottoms to produce solid paraformaldehyde.

4. The process of producing paraformaldehyde comprising heating to a temperature within the approximate range 90–100° C. an aqueous solution containing hydrated formaldehyde and formaldehyde polymers, maintaining said solution at said temperature for a period of about one half to one hour, removing water from the resulting depolymerized solution by evaporation at a pressure below 0.1 atmosphere at such a rate that the still bottoms reach a temperature in the range 75–85° C. before the still bottoms exhibit more than a slight turbidity and cooling the still bottoms to produce solid paraformaldehyde.

5. The process of producing paraformaldehyde comprising heating to a temperature within the approximate range 90–100° C. an aqueous solution containing hydrated formaldehyde and formaldehyde polymers, maintaining said solution at said temperature for a period of about one half to one hour, removing water from the resulting depolymerized solution by evaporation at a pressure in the approximate range 10 to 30 mm. of mercury at such a rate that the still bottoms reach a temperature in the range 75–85° C. before the still bottoms exhibit more than a slight turbidity and cooling the still bottoms to produce solid paraformaldehyde.

6. The process of producing paraformaldehyde comprising heating to the atmospheric boiling point thereof an aqueous solution containing hydrated formaldehyde and formaldehyde polymers, maintaining said solution at its atmospheric pressure boiling point for a period of about one half to one hour, removing water from the resulting depolymerized solution by evaporation at a pressure below 0.1 atmosphere at such a rate that the still bottoms reach a temperature in the range 75–85° C. before the still bottoms exhibit more than a slight turbidity and cooling the still bottoms to produce solid paraformaldehyde.

7. The process of producing paraformaldehyde comprising heating to the atmospheric pressure boiling point thereof an aqueous solution containing hydrated formaldehyde and formaldehyde polymers, maintaining said solution at its atmospheric pressure boiling point for a period of about one half to one hour, removing water from the resulting depolymerized solution by evaporation at a pressure in the approximate range 10 to 30 mm. mercury at such a rate that the still bottoms reach a temperature in the range 75–85° C. before the still bottoms exhibit more than a slight turbidity and cooling the still bottoms to produce solid paraformaldehyde.

8. The process of producing paraformaldehyde comprising heating to a temperature within the approximate range 90–95° C. an aqueous solution containing hydrated formaldehyde and formaldehyde polymers, maintaining said solution at said temperature for a period of about one half to one hour, removing water from the resulting depolymerized solution by evaporation at a pressure below 0.1 atmosphere at such a rate that the still bottoms reach a temperature in the range 75–85° C. before the still bottoms exhibit more than a slight turbidity and cooling the still bottoms to produce solid paraformaldehyde.

9. The process of producing paraformaldehyde comprising heating to a temperature within the approximate range 90–95° C. an aqueous solution containing hydrated formaldehyde and formaldehyde polymers, maintaining said solution at said temperature for a period of about one half to one hour, removing water from the resulting depolymerized solution by evaporation at a pressure in the approximate range 10 to 30 mm. of mercury at such a rate that the still bottoms reach a temperature in the range 75–85° C. before the bottoms exhibit more than a slight turbidity and cooling the still bottoms to produce solid paraformaldehyde.

References Cited in the file of this patent

UNITED STATES PATENTS

| | | |
|---|---|---|
| 1,871,019 | Walker | Aug. 9, 1932 |
| 2,568,016 | Walker | Sept. 18, 1951 |
| 2,675,346 | MacLean | Apr. 13, 1954 |

FOREIGN PATENTS

| | | |
|---|---|---|
| 420,993 | Great Britain | Dec. 12, 1934 |